(12) United States Patent
Fukuyama

(10) Patent No.: US 7,625,541 B2
(45) Date of Patent: Dec. 1, 2009

(54) METHOD FOR PURIFYING SILICON AND SILICON

(75) Inventor: Toshiaki Fukuyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 218 days.

(21) Appl. No.: 11/791,316

(22) PCT Filed: Oct. 5, 2005

(86) PCT No.: PCT/JP2005/018423

§ 371 (c)(1),
(2), (4) Date: May 23, 2007

(87) PCT Pub. No.: WO2006/061944

PCT Pub. Date: Jun. 15, 2006

(65) Prior Publication Data

US 2007/0297968 A1    Dec. 27, 2007

(30) Foreign Application Priority Data

Dec. 9, 2004    (JP) ............................ 2004-357055

(51) Int. Cl.
*C01B 33/00* (2006.01)
*C01B 33/02* (2006.01)
*C01B 33/037* (2006.01)

(52) U.S. Cl. ................... 423/348; 423/349; 423/350

(58) Field of Classification Search ................ 423/348, 423/349, 350

See application file for complete search history.

(56) References Cited

U.S. PATENT DOCUMENTS

| 5,972,107 A | 10/1999 | Schmid et al. |
| 2005/0139148 A1* | 6/2005 | Fujiwara et al. ............... 117/13 |

FOREIGN PATENT DOCUMENTS

| GB | 2116956 A * | 10/1983 |
| JP | 4-228414 | 8/1992 |
| JP | 6-227808 | 8/1994 |
| JP | 6-2277808 | 8/1994 |
| JP | 8-73209 | 3/1996 |
| JP | 2001-58811 | 3/2001 |
| JP | 2004-262746 | 9/2004 |
| WO | WO 03066523 A1 * | 8/2003 |

OTHER PUBLICATIONS

International Search Report of PCT/JP2005/018423, mailed Jan. 17, 2006.
Advanced Physical Chemistry for Process Metallurgy, pp. 108-109, Published 1997.
CN 1628076 A, Jun. 15, 2005, corresponds to US 2005/139148 A1 (with English Abstract).

* cited by examiner

*Primary Examiner*—Timothy C Vanoy
(74) *Attorney, Agent, or Firm*—Nixon & Vanderhye P.C.

(57) ABSTRACT

The invention provides a method for purifying silicon which comprises a step of blowing a treating gas generated by reacting carbon with an oxidized gas into a molten silicon, as well as silicon produced by the method. Carbon can be held in a container, the oxidized gas can be passed through the container, and the oxidized gas can contain at least one of water vapor and hydrogen.

20 Claims, 4 Drawing Sheets

METHOD FOR PURIFYING SILICON AND SILICON

This application is the US national phase of international application PCT/JP2005/018423, filed 5 Oct. 2005, which designated the U.S. and claims priority of JP 2004-357055, filed 9 Dec. 2004, the entire contents of each of which are hereby incorporated by reference.

TECHNICAL FIELD

The present invention relates a method for purifying silicon and silicon, and in particular to a method for purifying silicon wherein silicon can be efficiently purified and silicon obtained by the method.

BACKGROUND ART

Iron, aluminum, copper and silicon seldom occur in nature as elementary substances and mostly occur as compounds such as oxides. Accordingly, when these are used as a structural material, electroconductive material or semiconductor material, these oxides should be reduced in order to remove impurities. However, impurities cannot be sufficiently removed by mere reduction of these oxides. Accordingly, the amount of impurities contained therein should be further reduced. A step of reducing the amount of such impurities is referred to as purification.

In purification of iron used as a structural material, for example, pig iron removed from a blast furnace is contacted with a molten oxide called slag, whereby impurities such as sulfur and phosphorus remarkably deteriorating toughness are incorporated into the slag thereby reducing the content of impurities in the pig iron. With respect to carbon as an impurity capable of determining the mechanical strength of steel, an oxygen gas is blown into pig iron, whereby carbon in the pig iron is oxidized and removed as carbon dioxide gas, thereby regulating the amount of carbon in the pig iron.

In purification of copper used as an electroconductive material, the phenomenon in which the segregation coefficient of impurities, that is, the ratio of the concentration of impurities in solid copper to the concentration of impurities in molten copper in an equilibrium state, is low can be utilized to lower the concentration of impurities in solid copper by solidifying molten copper at such a low rate as to be in an almost equilibrium state.

In purification of silicon used as a semiconductor material, silicon with a purity of 98% or more obtained by reducing silica is converted into gases such as silane ($SiH_4$) and trichlorosilane ($SiHCl_3$), and these gases are decomposed in a Bell-jar furnace or reduced with hydrogen, whereby polycrystalline silicon with a purity of about 11 N can be obtained. This polycrystalline silicon is used for growth of single-crystalline silicon, whereby single-crystalline silicon used in production of electronic devices such as LSI can be obtained. For obtaining single-crystalline silicon used in production of electronic devices, a very complicated manufacturing process and strict management of the manufacturing process are necessary, thus inevitably increasing the production costs thereof.

On one hand, demand for solar cell is rapidly increasing in recent years, owing to increasing awareness of energy problems such as depletion of fossil-fuel resources and environmental problems such as global warming. The required purity of silicon used in production of solar cells is about 6 N. Accordingly, irregular products of silicon for electronic devices, which have been previously used in production of solar cells, have excess qualities as silicon for solar cells.

Because the amount of generated irregular products of silicon for electronic devices has been surpassing the demanded amount of solar cells up to now, there has been no problem. However, the demanded amount of solar cells will certainly surpass the amount of generated irregular products of silicon for electronic devices in the future, so establishment of techniques for inexpensively manufacturing silicon for solar cells is strongly demanded. As such techniques, techniques of purification by a metallurgical method utilizing the redox reaction or solidification segregation described above attract attention in recent years.

Among impurities contained in silicon for solar cells, phosphorus and boron both have a high segregation coefficient. Accordingly, the method of purification by solidification segregation is known to have little effect for removal of phosphorus and boron.

It follows that with respect to removal of phosphorus, Japanese Patent Laying-Open No. 6-227808 (Patent Document 1) discloses a method for releasing phosphorus into a gaseous phase by keeping molten silicon in a reduced-pressure atmosphere.

With respect to removal of boron, Japanese Patent Laying-Open No. 4-228414 (Patent Document 2) discloses a method that involves irradiating the surface of molten silicon with plasma of a mixed gas containing an inert gas and water vapor. U.S. Pat. No. 5,972,107 (Patent Document 3) discloses a method that involves dipping a torch of burning hydrogen and oxygen into molten silicon. Japanese Patent Laying-Open No. 2001-58811 (Patent Document 4) discloses a method that involves blowing a treating gas into molten silicon under stirring. Japanese Patent Laying-Open No. 8-73209 (Patent Document 5) discloses a method that involves continuously introducing slag into molten silicon. All of these methods for removing boron are those for removing boron oxides from molten silicon.

Patent Document 1: Japanese Patent Laying-Open No. 6-227808

Patent Document 2: Japanese Patent Laying-Open No. 4-228414

Patent Document 3: U.S. Pat. No. 5,972,107

Patent Document 4: Japanese Patent Laying-Open No. 2001-58811

Patent Document 5: Japanese Patent Laying-Open No. 8-73209

DISCLOSURE OF THE INVENTION

Problems to be Solved by the Invention

However, these disclosed methods for purifying silicon cannot be said to be satisfactory in respect of the rate of removal of boron, thus failing to purify silicon efficiently.

When a water vapor-containing gas described in Patent Document 4 is passed through a gas blowing pipe made of graphite and blown into molten silicon, a gas flow path 71 and a gas blowout opening 61 of a gas blowing pipe 81 made of graphite are significantly oxidatively consumed with water vapor (the original shape is indicated by a dotted line in FIG. 5), as shown in the schematic enlarged sectional view of FIG. 5. As gas blowout opening 61 is thus enlarged, the sizes of gas bubbles blown out therethrough are increased, and thus the surface area of the gas bubbles per unit volume of molten silicon is decreased, thus causing a reduction in the rate of removal of boron. There is also a problem that the longevity of gas blowing pipe 81 made of graphite is shortened with the above oxidative consumption, resulting in an increase in the cost for purification of silicon. A hollow alumina pipe 91 arranged in gas blowing pipe 81 shown in FIG. 5 tends to be hardly oxidatively consumed with the above water vapor-containing gas.

In light of the circumstances described above, the object of the present invention is to provide a method for purifying silicon wherein silicon can be efficiently purified and silicon obtained by the method.

Means for Solving the Problems

The present invention relates to a method for purifying silicon which includes a step of blowing a treating gas formed by reacting carbon with an oxidized gas into molten silicon.

In the method for purifying silicon according to the present invention, the carbon can be held in a container and the oxidized gas can be passed through the container.

In the method for purifying silicon according to the present invention, the carbon held in the container can contain at least one member selected from the group consisting of powdery carbon, cylindrical carbon and plate-shaped carbon.

In the method for purifying silicon according to the present invention, the temperature of an atmosphere in the container can be 380° C. or more.

In the method for purifying silicon according to the present invention, the oxidized gas can contain water vapor.

In the method for purifying silicon according to the present invention, the oxidized gas can contain hydrogen.

In the method for purifying silicon according to the present invention, slag can be mixed in the molten silicon.

In the method for purifying silicon according to the present invention, the slag can contain silicon oxide.

In the method for purifying silicon according to the present invention, the slag can contain an alkali metal oxide.

In the method for purifying silicon according to the present invention, the slag can contain at least one member selected from the group consisting of an alkali metal carbonate, an alkali metal hydrogencarbonate and an alkali metal silicate.

In the method for purifying silicon according to the present invention, the treating gas can be blown into the molten silicon through a gas blowing pipe dipped therein while the gas blowing pipe is rotated.

The present invention relates to silicon purified by any of the methods for purifying silicon described above.

EFFECTS OF THE INVENTION

According to the present invention, there can be provided a method for purifying silicon wherein silicon can be efficiently purified, as well as silicon obtained by the method.

DESCRIPTION OF THE REFERENCE SIGNS

Figure 1:
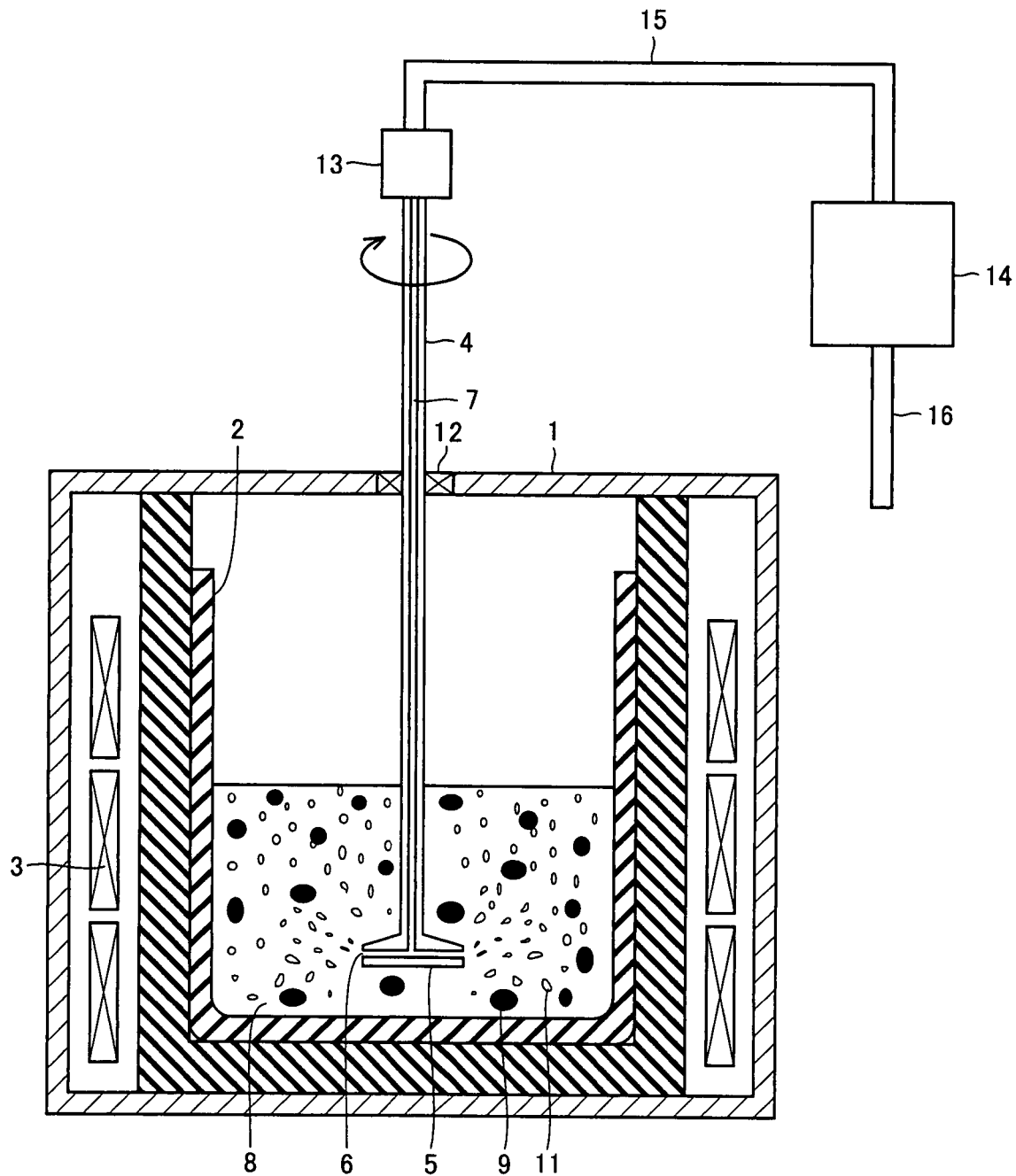
FIG. 1 is a schematic sectional view of one preferable example of a part of an apparatus used in the present invention.

1 is a melting furnace; 2, melting pot; 3, electromagnetic induction heating device; 4, 81, gas blowing pipe; 5, stirring part; 6, 61, gas blowout opening; 7, 71, gas flow path; 8, molten silicon; 9, molten slag; 10, blade; 11, gas bubble; 12, sealing mechanism; 13, rotation driving mechanism; 14, carbon holding container; 15, treating gas introduction pipe; 16, oxidized gas feeding pipe; 17, cap; 18, gas passing opening; 19, heater; 20, carbon powder; 21, carbon pipe; 22, carbon pipe board; and 91, alumina pipe.

BEST MODES FOR CARRYING OUT THE INVENTION

Hereinafter, the embodiments of the invention are described. In the drawings of the invention, the same reference number refers to the same part or the corresponding part.

(Apparatus)

FIG. 1 is a schematic sectional view of one preferable example of a part of an apparatus used in the present invention. In FIG. 1, the apparatus used in the present invention includes a melting furnace 1 having a stainless steel wall surface, a melting pot 2 made of graphite, an electromagnetic induction heating device 3, and a gas blowing pipe 4 made of graphite. Molten silicon 8 is injected into melting pot 2, and if necessary, molten slag 9 is mixed therein.

Gas blowing pipe 4 is provided with a stirring part 5 in the lower part, and a gas blowout opening 6 is formed at the end of stirring part 5. Gas blowing pipe 4 is provided in the upper part with a rotation driving mechanism 13 for rotating stirring part 5 in molten silicon 8 and with a lifting and lowering mechanism (not shown) for dipping stirring part 5 in molten silicon 8 and for removing it from molten silicon 8. A hollow gas flow path 7 serving as a path through which a gas such as treating gas passes is formed in the inside of gas blowing pipe 4 including stirring part 5. A part of the wall of melting furnace 1 where gas blowing pipe 4 penetrates is provided with a sealing mechanism 12 for securing the air tightness of melting furnace 1 and for enabling the rotation of gas blowing pipe 4. A treating gas introduction pipe 15 for introducing a treating gas formed in a carbon holding container 14 into gas blowing pipe 4 is arranged in the upper part of gas blowing pipe 4. An oxidized gas feeding pipe 16 is arranged in the lower part of carbon holding container 14.

Figure 2:
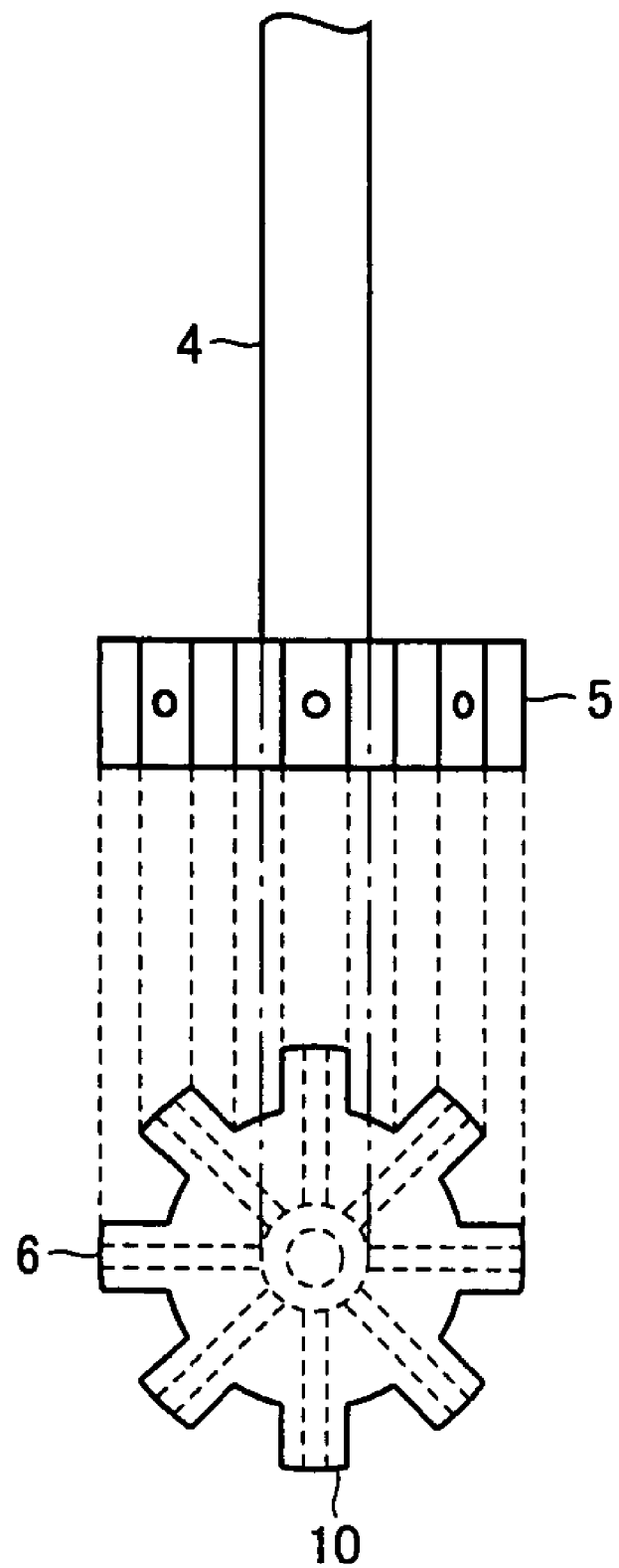
FIG. 2 is a schematic side view of one preferable example of a part of a gas blowing pipe used in the present invention and a schematic bottom view thereof.

FIG. 2 is a schematic side view of a part of gas blowing pipe 4 and a schematic bottom view thereof. As shown in FIG. 2, stirring part 5 is structured such that a plurality of blades 10 radially project toward the outside of gas blowing pipe 4, and gas blowout opening 6 is formed at the end of each of blades 10. The shape of stirring part 5 is not limited to the shape described above insofar as gas bubbles 11 of a treating gas, molten slag 9 and the like shown in FIG. 1 can be uniformly dispersed in molten silicon 8.

(Purification Method)

Hereinafter, a preferable example of the method for purifying silicon according to the present invention is described. First, solid starting silicon and slag are introduced into melting pot 2 in the apparatus shown in FIG. 1, and the atmosphere in melting furnace 1 is replaced by an inert gas such as argon, and then melting pot 2 is heated with electromagnetic induction heating device 3. Then, the temperature of the starting silicon and slag is increased by heat transfer from melting pot 2 to melt these materials. The melt thus obtained is kept at a predetermined treatment temperature, for example at 1450 to 1600° C. When slag is added, molten silicon and molten slag are completely separated from each other as 2 layers prior to stirring of the melt.

Then, gas blowing pipe 4 with the lifting and lowering mechanism (not shown) is lowered, and as shown in FIG. 1, gas blowing pipe 4 and stirring part 5 are dipped in molten silicon 8 in melting pot 2. Then, a treating gas introduced into hollow gas flow path 7 in gas blowing pipe 4 is blown from gas blowout opening 6 into molten silicon 8, while gas blowing pipe 4 is rotated in the direction shown by an arrow with rotation driving mechanism 13 to stir molten silicon 8.

By so doing, gas bubbles 11 of a treating gas blown into molten silicon 8, and molten slag 9, can be finely divided and treating gas bubbles 11 and molten slag 9 can be uniformly dispersed in molten silicon 8. Then, the reaction among molten silicon 8, molten slag 9 and the treating gas is accelerated in the whole of molten silicon 8 to form an oxide of boron contained in molten silicon 8, and the boron oxide is removed from molten silicon 8, for example by gasification of this oxide.

In the present invention, therefore, the treating gas can be uniformly dispersed in molten silicon 8, and boron can be removed from the whole of molten silicon 8 substantially simultaneously, thus improving the rate of removal of boron to achieve efficient purification of silicon.

(Treating Gas)

In the present invention, the treating gas is generated by reaction of carbon with an oxidized gas. For example, a gas containing at least one member selected from the group consisting of air, oxygen, carbon dioxide, water vapor and hydrogen is used as the oxidized gas. For example, a gas containing at least one kind of carbon-containing gases such as carbon monoxide, carbon dioxide and hydrocarbon is generated as the treating gas. The present inventors found that when the treating gas is blown into the molten silicon, the rate of removal of boron can be improved to purify silicon efficiently. For example, methane ($CH_4$) or the like is generated as the hydrocarbon.

Other components contained in the treating gas include, for example, argon (Ar), nitrogen, oxygen, hydrogen and water vapor. Particularly when water vapor is contained in the treating gas, water vapor is more oxidative than carbon monoxide and carbon dioxide and is thus liable to further improve the rate of removal of impurities such as boron. By using a usual humidification device to regulate the dew point of the treating gas typically in the range of 20 to 90° C., the amount of water vapor in the treating gas can be easily regulated in the range of about 2 to 70 vol % based on the whole of the treating gas. An inert gas such as argon is preferably used as carrier gas.

The total percentage by volume of carbon-containing gases such as carbon monoxide, carbon dioxide and hydrocarbon in the treating gas is preferably 1 vol % or more and 50 vol % or less based on the whole of the treating gas. This is because when the percentage is less than 1 vol %, the improvement in the efficiency of purification of silicon by the treating gas tends to be hardly achieved, while when the percentage is greater than 50 vol %, the removal of carbon mixed in molten silicon tends to be difficult. In this case, a gas such as argon or water vapor is blown through gas blowing pipe 4, while a carbon-containing gas such as carbon monoxide, carbon dioxide or hydrocarbon may be blown from a site other than gas blowing pipe 4.

The pressure at which the treating gas is introduced into molten silicon is preferably greater than 1 atmospheric pressure, more preferably in the range of 0.15 MPa or more and 0.3 MPa or less. In this case, even if highly viscous slag has been mixed in molten silicon, blowout of the treating gas tends to be stably continued.

Figure 3:
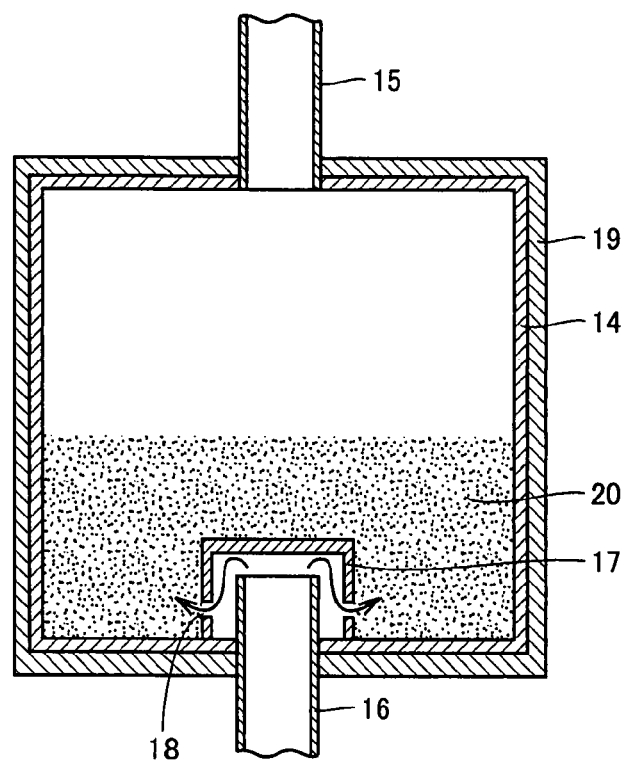
FIG. 3 is a schematic sectional view of one preferable example of a carbon holding container used in the present invention.
Figure 4:
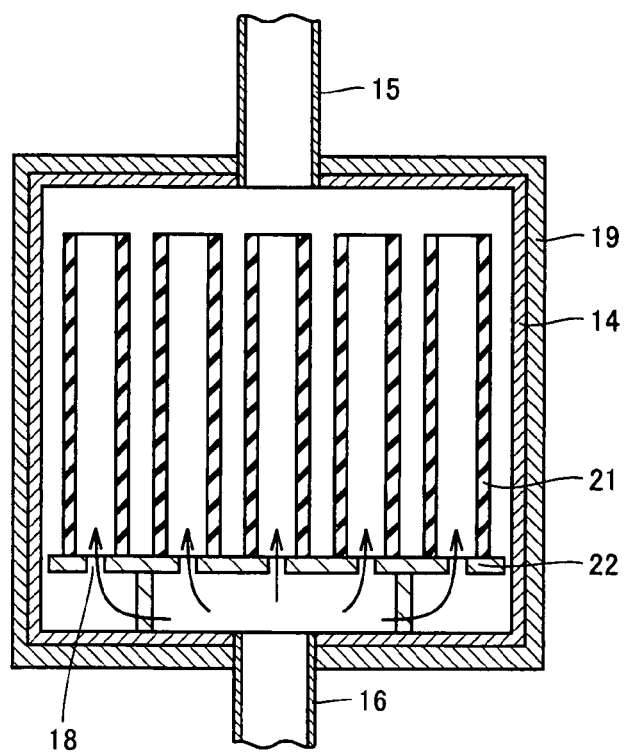
FIG. 4 is a schematic sectional view of another preferable example of the carbon holding container used in the present invention.
Figure 5:
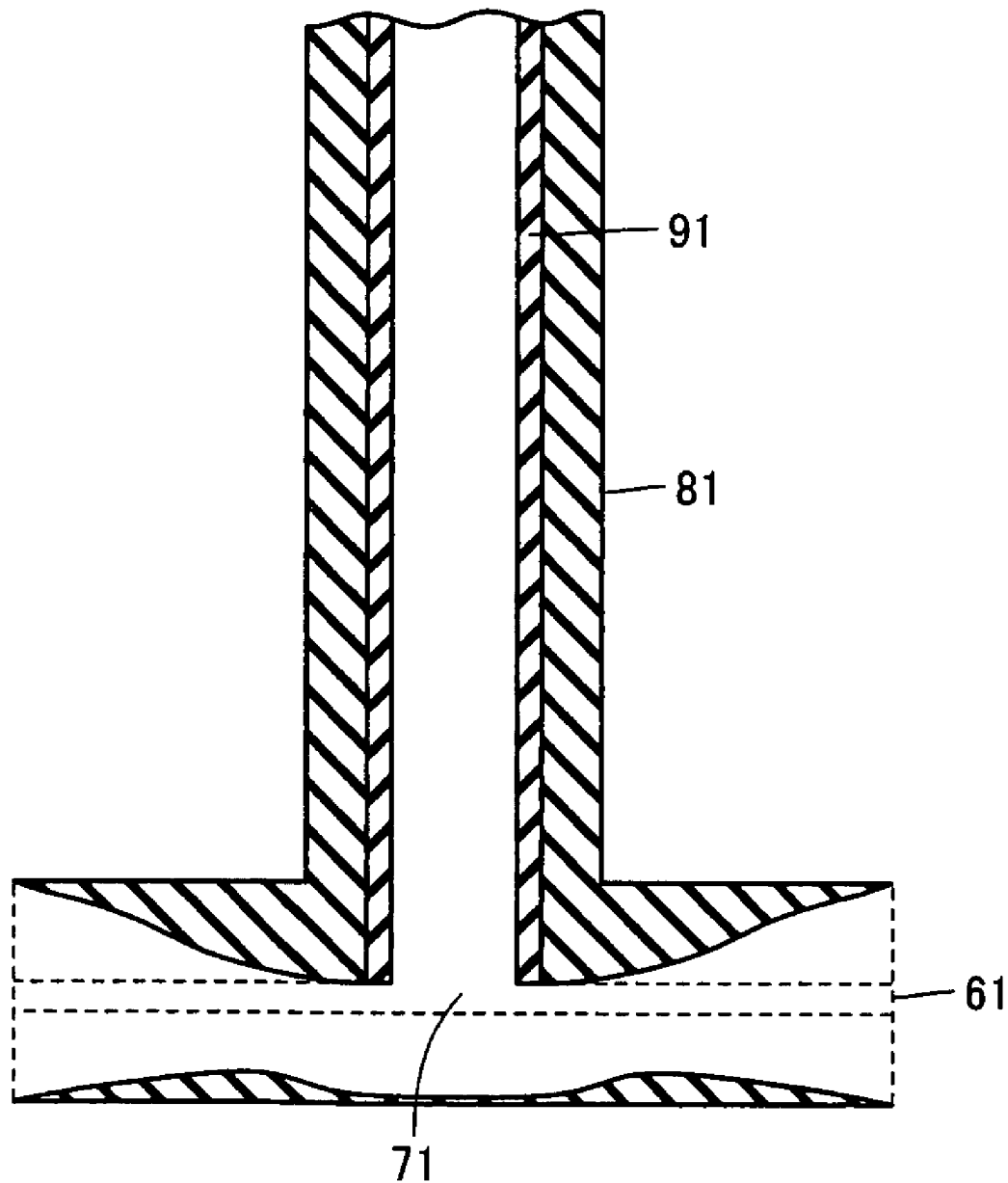
FIG. 5 is a schematic enlarged sectional view illustrating the oxidative consumption of a conventional gas blowing pipe made of graphite.

A schematic sectional view of a preferable example of a part of the carbon holding container used in the present invention is shown in FIGS. 3 and 4. When powdery carbon is held in the carbon holding container, for example, carbon holding container 14 shown in the schematic sectional view of FIG. 3 is used. An oxidized gas is introduced through oxidized gas feeding pipe 16 into carbon holding container 14, then passed through a gas passing opening 18 formed in a cap 17, and blown into carbon powder 20. Then, the oxidized gas reacts with carbon powder 20 in carbon holding container 14 to generate a treating gas, and the generated treating gas flows in treating gas introduction pipe 15.

Gas passing opening 18 may be circular, slit-shaped or lattice-shaped. Carbon powder 20 has a larger contact area with the gas and is thus preferable in respect of more efficient generation of a treating gas than with cylindrical or plate-shaped carbon. In the case of continuous operation, carbon powder 20 is also preferable in that it is superior in operativeness to cylindrical or plate-shaped carbon because additional carbon powder 20 can be fed to carbon holding container 14 through a carbon powder feeding opening (not shown) arranged in carbon holding container 14 in order to compensate for consumed carbon powder. The material of carbon holding container 14 can be selected from materials such as stainless steel, ceramics and refractory brick, depending on the temperature at which a desired treating gas is generated. Carbon holding container 14 can be heated by a heater 19 such that the temperature of the atmosphere in carbon holding container 14 reaches the temperature at which a desired treating gas is generated. When carbon dioxide is generated as the treating gas, air is preferably introduced as an oxidized gas into carbon holding container 14 with an atmosphere at a temperature of, for example, 380 to 400° C. When a mixed gas of hydrogen and carbon monoxide is generated as the treating gas, water vapor is preferably introduced as an oxidized gas through oxidized gas feeding pipe 16 into carbon holding container 14 with an atmosphere at a temperature of, for example, 700 to 750° C. When carbon monoxide is generated as the treating gas, carbon dioxide is preferably introduced as an oxidized gas through oxidized gas feeding pipe 16 into carbon holding container 14 with an atmosphere at a temperature of, for example, 800 to 900° C. When methane is generated as the treating gas, hydrogen is preferably introduced as an oxidized gas through oxidized gas feeding pipe 16 into carbon holding container 14 with an atmosphere at a temperature of, for example, 1000 to 1200° C. However, the constitutions of the oxidized gas, the temperature of the atmosphere in carbon holding container 14, and the treating gas in the present invention are not limited to those described above and can be suitably established.

When cylindrical and/or plate-shaped carbon is held in the carbon holding container, carbon holding container 14 shown in, for example, the schematic sectional view of FIG. 4 is used. In this case, an oxidized gas is introduced through oxidized gas feeding pipe 16 into carbon holding container 14, passed through gas passing opening 18 formed on a carbon pipe board 22 in carbon holding container 14 and blown into the hollow part of a cylindrical carbon pipe 21. Then, the oxidized gas reacts with carbon pipe 21 to generate a treating gas, and the generated treating gas flows in treating gas introduction pipe 15.

FIG. 4 shows the case where cylindrical carbon pipe 21 is used, but a plate-shaped carbon plate may be used, or both a cylindrical pipe and a plate-shaped plate may be used. When a carbon plate is used, the carbon plate may be set up lengthwise such that the surface of the carbon plate is in a direction parallel to the direction along which the oxidized gas flows, or for prolonging the time for contacting the oxidized gas with the carbon plate, the carbon plates may be arranged alongside with a space therebetween such that the surface of the carbon plate is in a direction perpendicular to the direction along which the oxidized gas flows.

(Gas Blowing Pipe)

Graphite is preferably used as the material of gas blowing pipe 4 and stirring part 5 shown in FIG. 1, and graphite is also preferably used as the material of melting pot 2. This is because graphite is not melted even upon contacting with molten silicon 8 at a temperature higher than 1400° C. and can be easily processed. When graphite is used as the material of melting pot 2, gas blowing pipe 4 or stirring part 5, a treating gas particularly a treating gas containing at least one of carbon monoxide and carbon dioxide is blown into molten silicon 8, whereby melting pot 2 made of graphite, gas blowing pipe 4 and stirring part 5 can be used for a longer time.

That is, water vapor has been conventionally mainly used as the treating gas for oxidizing impurities such as boron. However, the present inventors have revealed, through further extensive study, that when water vapor was used, an inner surface of melting pot 2 made of graphite, an outer surface of gas blowing pipe 4, gas flow path 7 of gas blowing pipe 4, the surface of a gas flow path of stirring part 5 and the like were consumed by reaction with water vapor as an oxidized gas as time for purifying silicon advances.

By consumption of these graphite members, carbon is mixed in molten silicon 8, resulting in improvement of the ability to purify silicon, but there arises a problem that the wall thickness of melting pot 2 and gas blowing pipe 4 is reduced to deteriorate the strength and shorten the usable period of such members. Further, there is a further revealed problem that the diameter of gas blowout opening 6 is increased, thus failing to produce fine gas bubbles 11 of the treating gas, which leads to a longer time of purification of silicon.

The temperature of molten silicon 8 is kept at a high temperature of, for example, 1450 to 1600° C. Accordingly, melting pot 2 contacting with molten silicon 8, a part of gas blowing pipe 4, and stirring part 5 are heated to a temperature almost the same as the temperature of molten silicon 8. By heat transfer from molten silicon 8, a site of gas blowing pipe 4, near the surface of molten silicon 8, is heated to about 500° C. or more. If an oxidized gas such as water vapor is contacted with such members made of graphite, in an environment wherein graphite is easily oxidized, then these members made of graphite would be easily oxidized.

In the present invention, therefore, a treating gas, particularly a treating gas containing at least one of carbon monoxide and carbon dioxide is previously generated in carbon holding container 14 and then blown into molten silicon 8, thereby preventing oxidative corrosion of graphite in the surface of gas blowing pipe 4 and the gas flow path of stirring part 5, and further the concentration of carbon in molten silicon 8 is increased thereby achieving a reduction in the amount of carbon eluted from graphite melting pot 2, gas blowing pipe 4 and stirring part 5 to molten silicon 8. In the present invention, therefore, graphite members such as melting pot 2 and gas blowing pipe 4 can be used for a longer time than conventional. This can lead to the long-term operation of the apparatus to achieve efficient and inexpensive production of silicon for solar cells.

Use of hardly oxidized materials (oxidation-resistant materials) in place of graphite as the material of melting pot 2, gas blowing pipe 4 and stirring part 5 can also be anticipated. Use of materials such as silicon carbide and silicon nitride as the materials substituted for graphite can also be anticipated. However, it is very difficult to produce large members such as melting pot 2, gas blowing pipe 4 and stirring part 5 by using these oxidation-resistant materials, thus resulting in a significant increase in the production costs of these members.

In another example of the material of melting pot 2, gas blowing pipe 4 and stirring part 5, use of oxide ceramics can also be anticipated. Particularly aluminum oxide (alumina) can be used to produce the large members described above, and the manufacturing costs of the members can be reduced. However, oxide ceramics can be sometimes severely corroded with slag.

Accordingly, use of graphite as the material of the members, particularly members such as melting pot 2, gas blowing pipe 4 and stirring part 5, constituting the apparatus used in the present invention can be said to be most desirable, but it is also preferable that at least a part of gas flow path 7 of gas blowing pipe 4 is produced from an oxidation-resistant material in order to prevent gas flow path 7 from being oxidized with the oxidized gas, thereby more certainly preventing consumption of gas blowing tube 4.

In the present invention, the oxidation-resistant material is a material not changing significantly the outward appearance or mechanical strength even upon contacting with a gas containing 2 vol % or more water vapor or oxygen at a temperature of not less than 1412° C. that is the melting point of silicon, and known materials such as alumina, silicon nitride and silicon carbide can be used, and particularly alumina is preferable because it is inexpensive and superior in strength at high temperatures and in resistance to the oxidized gas.

The method for producing gas flow path 7 from the oxidation-resistant material is not particularly limited and a hollow pipe made of the oxidation-resistant material is inserted to cover the inner surface of a hollow part of gas blowing pipe 4 therewith, to form gas flow path 7; the inner surface of gas flow path 7 that is a hollow part of gas blowing pipe 4 may be coated with the oxidation-resistant material in a paste state; or a thin film of the oxidation-resistant material may be formed by vapor deposition, vapor-phase growth or the like.

(Stirring)

When slag having greater specific gravity than that of starting silicon is added, a melt of starting silicon and slag after melting is separated into 2 layers, and thus gas blowing pipe 4 is preferably rotated after stirring part 5 is lowered to a position near the interface between a molten silicon layer as the upper layer and a slag layer as the lower layer. In this case, gas bubbles 11 of the treating gas blown out from gas blowout opening 6 and molten slag 9 can be easily dispersed more uniformly in molten silicon 8. Then, the treating gas, molten silicon 8, molten slag 9 and the like are mixed very efficiently in melting pot 2, and the contact area between the phases is significantly increased. In such a state, the oxidation reaction of impurities such as boron in molten silicon 8 with the oxidized gas that can be contained in the treating gas or with oxygen supplied from molten slag 9 is significantly accelerated.

By stirring molten slag 9 more uniformly in molten silicon 8, the function of molten slag 9 as the oxidizing agent can be efficiently brought about. However, it is not necessary to melt the whole of the slag, and even if a part of the slag is in a solid state, almost the same effect can be obtained. From the viewpoint of removal of impurities such as boron, however, both silicon and slag are desirably maintained in a molten state at the time of purifying silicon.

When slag is added to silicon, the silicon may be either in a solid or molten state, and the slag added may be either in a solid or liquid state.

When slag is not added to staring silicon, or slag with lower specific gravity than starting silicon is added, stirring part 5 is preferably lowered downward in molten silicon 8, followed by rotation of gas blowing pipe 4.

(Slag)

The slag that can be used in the present invention includes, for example, a mixture of silicon oxide and calcium oxide. For example, slag that is a mixture of silicon oxide and calcium oxide can be in a molten state at a temperature not less than about 146° C. that is higher than about 1412° C. that is the melting point of silicon, as can be seen from an $SiO_2$—CaO binary phase diagram shown on page 108 in Advanced Physical Chemistry for Process Metallurgy (published in 1997).

The fact that powder of silicon oxide is useful as an oxidizing agent is disclosed in, for example, Patent Documents 2 and 3 supra, but the powder of silicon oxide is poor in wettability with molten silicon 8, and a large amount of the powder of silicon oxide cannot be added to molten silicon 8, and thus the rate of purification treatment of silicon may be limited in some cases. Accordingly, a mixture of silicon oxide and calcium oxide can be used as slag to improve the wettability thereof with molten silicon 8 so that as the molten slag, the oxidizing agent necessary for purification treatment of silicon can be introduced in a large amount.

When slag consisting of a mixture of silicon oxide and calcium oxide is used, the mixture is preferably based on silicon oxide. When a mixture based on calcium oxide such as the one described in Patent Document 5 is used, the function of the slag as an oxidizing agent for impurities such as boron tends to be lowered.

However, when the mixture based on silicon oxide is used as slag, its molten slag 9 may adhere sometimes to gas blowout opening 6 to clog gas blowout opening 6 with molten slag 9. This is considered due to the fact that slag based on silicon oxide generally has high viscosity and is thus hardly released once adhering to the opening.

Accordingly, the present inventors found that at least one kind of alkali metal oxides such as lithium oxide and sodium oxide can be contained in slag based on silicon oxide in order to prevent the clogging of gas blowout opening 6. This is considered due to the fact that the inclusion of the alkali metal oxide in slag causes a reduction in the viscosity of molten slag 9 thereby restraining the slag from adhering to gas blowout opening 6.

When an alkali metal oxide is contained in slag, the alkali metal oxide may be contained directly therein, but because the alkali metal oxide will react with water to form the corresponding hydroxide showing strong alkalinity, sometimes care should be taken when handling.

Accordingly, at least one member selected from the group consisting of an alkali metal carbonate, an alkali metal hydrogencarbonate and an alkali metal silicate can also be contained in the slag. For example, lithium carbonate, lithium hydrogen carbonate or lithium silicate may be contained in the slag and then heated, thereby attaining the same effect as when lithium oxide is contained in the slag based on silicon oxide.

By mixing sodium carbonate, sodium hydrogen carbonate or sodium silicate with the slag based on silicon oxide and then heating the mixture, the same effect as that by mixing sodium oxide with the slag based on silicon oxide can be achieved.

As a matter of course, the slag materials used in the present invention are not limited to those described above. For example, an additive agent such as aluminum oxide, magnesium oxide, barium oxide or calcium fluoride generally used in the field of refining steel and the like may be suitably mixed.

EXAMPLES

Starting Silicon

Scrap silicon containing 65 ppm of boron and semiconductor-grade silicon with a purity of 11 N were mixed at a ratio of about 1:8 by weight, to prepare starting silicon A containing boron regulated at a concentration of about 7 ppm.

Scrap silicon containing 90 ppm of boron and semiconductor-grade silicon with a purity of 11 N were mixed at a ratio of 1:8 by weight, to prepare starting silicon B containing boron regulated at a concentration of about 10 ppm.

(Purifying Additive Agents)

A purifying additive agent A was prepared by mixing silicon dioxide ($SiO_2$) and calcium oxide (CaO), both of which were commercially available as a reagent (purity, 95% or more) in a powdery form, at a ratio of about 45 ($SiO_2$):55 (CaO) by mass.

A purifying additive agent B was prepared by mixing silicon dioxide ($SiO_2$) and calcium oxide (CaO), both of which were commercially available as a reagent (purity, 95% or more) in a powdery form, at a ratio of about 65 ($SiO_2$):35 (CaO) by mass.

A purifying additive agent C was prepared by mixing silicon dioxide ($SiO_2$), calcium oxide (CaO) and lithium silicate ($Li_2SiO_3$), all of which were commercially available as a reagent (purity, 95% or more) in a powdery form, at a ratio of about 10 ($SiO_2$):5(CaO):14($Li_2SiO_3$) by mass. When the purifying additive agent C is molten, silicon dioxide ($SiO_2$), calcium oxide (CaO) and lithium oxide ($Li_2O$) will be mixed in a ratio of about 67 ($SiO_2$):17(CaO):16($Li_2O$) by mass.

Example 1

First, 1 kg of starting silicon A was held in a melting pot 2 shown in FIG. 1, and the atmosphere in a melting furnace 1 was replaced by argon with 1 atmospheric pressure, and melting pot 2 was heated with an electromagnetic induction heating device 3, to prepare molten silicon 8 which was then kept at 1550° C. For measuring the boron content before purification, about 20 g of molten silicon 8 was picked out, 5 g of which was used in measurement.

Then, a suitable amount of carbon powder 20 was held in a carbon holding container 14 shown in FIG. 3, and air was introduced as an oxidized gas at a pressure of 0.2 MPa through an oxidized gas feeding pipe 16 into carbon holding container 14, and the temperature of the atmosphere in carbon holding container 14 was increased to 380° C. by a heater 19. A treating gas generated in carbon holding container 14 was collected through a treating gas introduction pipe 15, and the gas composition of the treating gas was analyzed by gas chromatography, indicating that nitrogen was 78 vol %, carbon dioxide was 12 vol %, and oxygen was 10 vol %.

Subsequently, the treating gas was confirmed to blow out from a gas blowout opening 6, in a stirring part 5, of gas blowing pipe 4 made of graphite shown in FIG. 1, and then a gas blowing pipe 4 was lowered with a lifting and lowering mechanism such that stirring part 5 was positioned downward in molten silicon 8, and gas blowing pipe 4 was dipped in molten silicon 8. The flow rate of the treating gas blowing out from gas blowout opening 6 was 3.0 L/min.

After it was confirmed that the treating gas was blown into molten silicon 8, gas blowing pipe 4 was rotated at 400 rpm with a rotating mechanism, to carry out purification treatment for 2 hours. The content of boron in the silicon before and after purification treatment, as determined by ICP (inductively-coupled plasma) emission spectrometry, was 7.2 ppm before purification treatment and 4.0 ppm after purification treatment.

After purification treatment, slight consumption of graphite was observed in gas blowing pipe 4 and in a gas flow path 7 in stirring part 5. The wall thickness of gas blowout opening 6 in stirring part 5, wherein graphite had been consumed most severely, was reduced by 0.4 mm. That is, the thickness of graphite was reduced at a rate of 0.2 mm/hr. However, the outward appearance of gas blowing pipe 4 and stirring part 5 after purification treatment was not so different from that before purification treatment.

Example 2

Purification treatment of silicon was carried out in the same manner as in Example 1 except that oxygen was introduced as an oxidized gas via oxidized gas feeding pipe 16 shown in FIG. 3 into carbon holding container 14, and the temperature of the atmosphere in carbon holding container 14 was increased to 1250° C. by heater 19. Then, the content of boron in the silicon before and after purification treatment, as determined in the same manner as in Example 1, was 7.0 ppm before purification treatment and 3.4 ppm after purification treatment.

After purification treatment, slight consumption of graphite was observed in gas blowing pipe 4 and in gas flow path 7 in stirring part 5. The wall thickness of gas blowout opening 6 in stirring part 5, wherein graphite had been consumed most severely, was reduced by 0.4 mm. That is, the thickness of graphite was reduced at a rate of 0.2 mm/hr. However, the outward appearance of gas blowing pipe 4 and stirring part 5 after purification treatment was not so different from that before purification treatment.

A treating gas generated in carbon holding container 14 in Example 2 was collected through treating gas introduction pipe 15, and the gas composition of this treating gas was analyzed by gas chromatography, revealing that carbon dioxide was 90 vol % and oxygen was 10 vol %.

Example 3

Purification treatment of silicon was carried out in the same manner as in Example 1 except that carbon dioxide was introduced as an oxidized gas via oxidized gas feeding pipe 16 shown in FIG. 3 into carbon holding container 14, and the temperature of the atmosphere in carbon holding container 14 was increased to 800° C. by heater 19. Then, the content of boron in the silicon before and after purification treatment, as determined in the same manner as in Example 1, was 7.0 ppm before purification treatment and 3.5 ppm after purification treatment.

After purification treatment, slight consumption of graphite was observed in gas blowing pipe 4 and in gas flow path 7 in stirring part 5. The wall thickness of gas blowout opening 6 in stirring part 5, wherein graphite had been consumed most severely, was reduced by 0.2 mm. That is, the thickness of graphite was reduced at a rate of 0.1 mm/hr. However, the outward appearance of gas blowing pipe 4 and stirring part 5 after purification treatment was not so different from that before purification treatment.

A treating gas generated in carbon holding container 14 in Example 3 was collected through treating gas introduction pipe 15, and the gas composition of this treating gas was analyzed by gas chromatography, revealing that carbon dioxide was 50 vol % and carbon monoxide was 50 vol %.

Example 4

Purification treatment of silicon was carried out in the same manner as in Example 1 except that a mixed gas consisting of argon and water vapor formed by passing argon as a carrier gas through a humidifying device was introduced as an oxidized gas via oxidized gas feeding pipe 16 shown in FIG. 3 into carbon holding container 14, and the temperature of the atmosphere in carbon holding container 14 was increased to 710° C. by heater 19. Then, the content of boron in the silicon before and after purification treatment, as determined in the same manner as in Example 1, was 7.4 ppm before purification treatment and 2.7 ppm after purification treatment.

After purification treatment, no consumption of graphite was observed in gas blowing pipe 4 and in gas flow path 7 in stirring part 5. Little change was observed for the outward appearance of gas blowing pipe 4 and stirring part 5 between before and after purification treatment.

A treating gas generated in carbon holding container 14 in Example 4 was collected through treating gas introduction pipe 15, and the gas composition of this treating gas was analyzed by gas chromatography, revealing that argon was 70 vol %, carbon monoxide was 15 vol %, and hydrogen was 15 vol %.

Example 5

Purification treatment of silicon was carried out in the same manner as in Example 1 except that a mixed gas consisting of hydrogen and water vapor formed by passing hydrogen as a carrier gas through a humidifying device was introduced as an oxidized gas via oxidized gas feeding pipe 16 shown in FIG. 3 into carbon holding container 14, and the temperature of the atmosphere in carbon holding container 14 was increased to 1000° C. by heater 19. Then, the content of boron in the silicon before and after purification treatment, as determined in the same manner as in Example 1, was 7.7 ppm before purification treatment and 2.9 ppm after purification treatment.

After purification treatment, no consumption of graphite was observed in gas blowing pipe 4 and in gas flow path 7 in stirring part 5. Little change was observed for the outward appearance of gas blowing pipe 4 and stirring part 5 between before and after purification treatment.

A treating gas generated in carbon holding container 14 in Example 5 was collected through treating gas introduction pipe 15, and the gas composition of this treating gas was analyzed by gas chromatography, revealing that hydrogen was 80 vol %, carbon monoxide was 10 vol %, and methane was 10 vol %.

Example 6

Purification treatment of silicon was carried out in the same manner as in Example 1 except that a mixed gas consisting of hydrogen and water vapor formed by passing hydrogen as a carrier gas through a humidifying device was introduced as an oxidized gas via oxidized gas feeding pipe 16 shown in FIG. 3 into carbon holding container 14, and the temperature of the atmosphere in carbon holding container 14 was increased to 700° C. by heater 19. Then, the content of boron in the silicon before and after purification treatment, as determined in the same manner as in Example 1, was 7.7 ppm before purification treatment and 2.9 ppm after purification treatment.

After purification treatment, no consumption of graphite was observed in gas blowing pipe 4 and in gas flow path 7 in stirring part 5. Little change was observed for the outward appearance of gas blowing pipe 4 and stirring part 5 between before and after purification treatment.

A treating gas generated in carbon holding container 14 in Example 6 was collected through treating gas introduction pipe 15, and the gas composition of this treating gas was analyzed by gas chromatography, revealing that hydrogen was 67 vol % and carbon monoxide was 33 vol %.

Example 7

Purification treatment of silicon was carried out in the same manner as in Example 6 except that the form of carbon holding container 14 was constituted as shown in FIG. 4, a cylindrical carbon pipe 21 was held in carbon holding container 14, and the temperature of the atmosphere in carbon holding container 14 was increased to 450° C. by heater 19. Then, the content of boron in the silicon before and after purification treatment, as determined in the same manner as in Example 6, was 7.4 ppm before purification treatment and 3.0 ppm after purification treatment.

After purification treatment, slight consumption of graphite was observed in gas blowing pipe 4 and in gas flow path 7 in stirring part 5. The wall thickness of gas blowout opening 6 in stirring part 5, wherein graphite had been consumed most severely, was reduced by 0.4 mm. That is, the thickness of graphite was reduced at a rate of 0.2 mm/hr. However, the outward appearance of gas blowing pipe 4 and stirring part 5 after purification treatment was not so different from that before purification treatment.

A treating gas generated in carbon holding container 14 in Example 7 was collected through treating gas introduction pipe 15, and the gas composition of this treating gas was analyzed by gas chromatography, revealing that hydrogen was 62 vol %, carbon monoxide was 31 vol %, and water vapor was 7 vol %.

Example 8

Purification treatment of silicon was carried out in the same manner as in Example 7 except that in place of cylindrical carbon pipe 21, a plate-shaped carbon plate was held lengthwise in carbon holding container 14 shown in FIG. 4, and the temperature of the atmosphere in carbon holding container 14 was increased to 400° C. by heater 19. Then, the content of boron in the silicon before and after purification treatment, as determined in the same manner as in Example 7, was 7.6 ppm before purification treatment and 3.2 ppm after purification treatment.

After purification treatment, slight consumption of graphite was observed in gas blowing pipe 4 and in gas flow path 7 in stirring part 5. The wall thickness of gas blowout opening 6 in stirring part 5, wherein graphite had been consumed most severely, was reduced by 0.6 mm. That is, the thickness of graphite was reduced at a rate of 0.3 mm/hr. However, the outward appearance of gas blowing pipe 4 and stirring part 5 after purification treatment was not so different from that before purification treatment.

A treating gas generated in carbon holding container 14 in Example 8 was collected through treating gas introduction pipe 15, and the gas composition of this treating gas was analyzed by gas chromatography, revealing that hydrogen was 60 vol %, carbon monoxide was 30 vol %, and water vapor was 10 vol %.

Example 9

First, 1 kg of mixture consisting of 830 g of starting silicon B and 170 g of purifying additive agent A was held in melting pot 2 shown in FIG. 1, and the atmosphere in melting furnace 1 was replaced by argon with 1 atmospheric pressure, and melting pot 2 was heated with electromagnetic induction heating device 3, to prepare molten silicon 8 which was kept at 1550° C. For measuring the boron content in the silicon before purification, about 20 g of molten silicon 8 was picked out, 5 g of which was used in measurement.

Then, a suitable amount of carbon powder 20 was held in carbon holding container 14 shown in FIG. 3, and a mixed gas consisting of hydrogen and water vapor formed by passing hydrogen as a carrier gas through a humidifying device was introduced at a pressure of 0.2 MPa as an oxidized gas via oxidized gas feeding pipe 16 into carbon holding container 14, and the temperature of the atmosphere in carbon holding container 14 was increased to 700° C. by a heater 19. A treating gas generated in carbon holding container 14 was collected through treating gas introduction pipe 15, and the gas composition of the treating gas was analyzed by gas chromatography, indicating that hydrogen was 67 vol % and carbon monoxide was 33 vol %.

Subsequently, the treating gas was confirmed to blow out from gas blowing opening 6, in stirring part 5, of gas blowing pipe 4 made of graphite, and then gas blowing pipe 4 was lowered with a lifting and lowering mechanism such that stirring part 5 was positioned downward in molten silicon 8, and gas blowing pipe 4 was dipped in molten silicon 8. The flow rate of the treating gas blowing out from gas blowout opening 6 was 3.0 L/min.

After it was confirmed that the treating gas was blown into molten silicon 8, gas blowing pipe 4 was rotated at 600 rpm with a rotating mechanism, to carry out purification treatment for 2 hours. The content of boron in the silicon before and after purification treatment, as determined in the same manner as in Example 1, was 9.8 ppm before purification treatment and 1.1 ppm after purification treatment.

After purification treatment, no consumption of graphite was observed in gas blowing pipe 4 and in gas flow path 7 in stirring part 5. Little change was observed for the outward appearance of gas blowing pipe 4 and stirring part 5 between before and after purification treatment.

Example 10

Purification treatment of silicon was carried out in the same manner as in Example 9 except that purifying additive agent B was used in place of purifying additive agent A. The content of boron in the silicon before and after purification treatment, as determined in the same manner as in Example 9, was 10.4 ppm before purification treatment and 0.43 ppm after purification treatment.

After purification treatment, no consumption of graphite was observed in gas blowing pipe 4 and in gas flow path 7 in stirring part 5. Little change was observed for the outward appearance of gas blowing pipe 4 and stirring part 5 between before and after purification treatment.

A treating gas generated in carbon holding container 14 in Example 10 was collected through treating gas introduction pipe 15, and the gas composition of this treating gas was analyzed by gas chromatography, revealing that hydrogen was 67 vol % and carbon monoxide was 33 vol %.

Example 11

Purification treatment of silicon was carried out in the same manner as in Example 9 except that purifying additive agent C was used in place of purifying additive agent A. The content of boron in the silicon before and after purification treatment, as determined in the same manner as in Example 9, was 9.8 ppm before purification treatment and 0.18 ppm after purification treatment.

After purification treatment, no consumption of graphite was observed in gas blowing pipe 4 and in gas flow path 7 in stirring part 5. Little change was observed for the outward appearance of gas blowing pipe 4 and stirring part 5 between before and after purification treatment.

A treating gas generated in carbon holding container 14 in Example 11 was collected through treating gas introduction pipe 15, and the gas composition of this treating gas was analyzed by gas chromatography, revealing that hydrogen was 67 vol % and carbon monoxide was 33 vol %.

Comparative Example 1

Purification treatment of silicon was carried out in the same manner as in Example 6 except that the temperature of the atmosphere in carbon holding container 14 was 200° C. The content of boron in the silicon before and after purification treatment, as determined in the same manner as in Example 6, was 7.3 ppm before purification treatment and 4.9 ppm after purification treatment.

After purification treatment, evident consumption of graphite was observed in gas blowing pipe 4 and in gas flow path 7 in stirring part 5. The wall thickness of gas blowout opening 6 in stirring part 5, wherein graphite had been consumed most severely, was reduced by 4 mm. That is, the thickness of graphite was reduced at a rate of 2 mm/hr. The diameter of gas blowout opening 6 was enlarged from 1 mm to 3 mm.

Water vapor, though having higher oxidizing power than that of carbon monoxide and carbon dioxide, showed a low ability to purify silicon. This is estimated due to the fact that the diameter of gas blowout opening 6 was enlarged thereby increasing the size of bubbles of the mixed gas, which results in a reduction in the rate of oxidation reaction of impurities such as boron.

An estimated reason for the higher consumption is that since the temperature of the atmosphere in carbon holding container 14 in Comparative Example 1 was 200° C., which was lower than 700° C. in Example 6, water vapor did not react with carbon and was introduced as water vapor in an intact state into gas blowing pipe 4.

A treating gas generated in carbon holding container 14 in Comparative Example 1 was collected through treating gas introduction pipe 15, and the gas composition of this treating gas was analyzed by gas chromatography, revealing that hydrogen was 70 vol % and water vapor was 30 vol %.

Comparative Example 2

Purification treatment of silicon was carried out in the same manner as in Example 4 except that a mixed gas consisting of argon and water vapor formed by passing argon as a carrier gas through a humidifying device was introduced as an oxidized gas into treating gas introduction pipe 15 directly without using a carbon holding container. Then, the content of boron in the silicon before and after purification treatment, as determined in the same manner as in Example 4, was 7.5 ppm before purification treatment and 2.8 ppm after purification treatment.

After purification treatment, evident consumption of graphite was observed in gas blowing pipe 4 and in gas flow path 7 in stirring part 5. The wall thickness of gas blowout opening 6 in stirring part 5, wherein graphite had been consumed most severely, was reduced by 5 mm. That is, the thickness of graphite was reduced at a rate of 2.5 mm/hr. The diameter of gas blowout opening 6 was enlarged from 1 mm to 3.5 mm.

An estimated reason for the higher consumption of graphite is that water vapor was introduced via treating gas introduction pipe 15 into gas blowing pipe 4 directly, thus causing progress of the oxidative consumption of graphite with the water vapor. The reason that water vapor, though having higher oxidizing power than that of carbon monoxide and carbon dioxide, did not allow the silicon purification ability to be significantly changed as compared with that of Example 4 is estimated due to the fact that the diameter of gas blowout opening 6 was enlarged to increase the size of gas bubbles of the mixed gas, and such large gas bubbles led to a reduction in the rate of oxidation reaction of impurities such as boron.

A treating gas generated in carbon holding container 14 in Comparative Example 2 was collected through treating gas introduction pipe 15, and the gas composition of this treating gas was analyzed by gas chromatography, revealing that argon was 70 vol %, hydrogen was 15 vol %, and water vapor was 15 vol %.

In the Examples and Comparative Examples supra, the purification treatment was carried out for the predetermined time, and then gas blowing pipe 4 was lifted with a lifting and lowering mechanism until stirring part 5 was positioned sufficiently upward above the surface of molten silicon 8 shown in FIG. 1, and several grams of molten silicon 8 for measurement of boron content were taken out and measured for the content of boron in the silicon after purification treatment. In Examples 9, 10 and 11 wherein a slag material was added, the mixture was left for several minutes to sufficiently separate it into molten silicon 8 and molten slag 9 shown in FIG. 1 so that molten slag 9 was not mixed in molten silicon 8, and then the above molten silicon 8 for measurement of boron content was taken out.

In the Examples and Comparative Examples supra, a mixture of semiconductor-grade silicon and boron-containing scrap silicon was used as starting silicon, but it goes without saying that a starting material containing impurities other than boron, for example, silicon having a purity of about 98% utilized widely in industry, can be used to exhibit the effect of the present invention.

In Examples 9, 10 and 11, solid slag was added to solid silicon and these materials were then melted, but it goes without saying that the same effect as achieved therein can be exhibited by adding solid slag to molten silicon and then melting the mixture or by adding molten slag to solid silicon and melting the mixture, or by adding molten slag to molten silicon and maintaining the mixture in a molten state.

The present invention is not limited to the Examples, and depending on the amount of the starting silicon to be treated, the shape of the melting pot and the like, the amount of slag mixed, the flow volume of the treating gas, and the number of rotations of the gas blowing pipe, for example, should be properly selected so as to be under the most suitable conditions.

The presently disclosed embodiments and examples are set forth for illustrative purposes only and not construed as limiting. The scope of the present invention is set forth not in the above description but in the claims and intended to encompass every modification in the scope of the claims and in the meaning of equivalence of the claims.

INDUSTRIAL APPLICABILITY

According to the present invention, silicon can be efficiently purified by increasing the rate of removal of boron. According to the present invention, therefore, silicon for solar cells can be inexpensively produced and thus the present invention can be preferably used in production of solar cells.

The invention claimed is:

1. A method for purifying silicon which comprises generating a treating gas by reacting carbon with an oxidized gas wherein the carbon is held in a container and the oxidized gas is passed through the container; and
blowing said treating gas into a molten silicon such that said silicon is purified.

2. The method for purifying silicon according to claim 1, wherein the carbon held in the container comprises at least one member selected from the group consisting of powdery carbon, cylindrical carbon and plate-shaped carbon.

3. The method for purifying silicon according to claim 1, wherein the temperature of an atmosphere in the container is 380° C. or more.

4. The method for purifying silicon according to claim 1, wherein the oxidized gas contains water vapor.

5. The method for purifying silicon according to claim 4, wherein the oxidized gas contains hydrogen.

6. The method for purifying silicon according to claim 1, wherein slag is mixed in the molten silicon.

7. The method for purifying silicon according to claim 6, wherein the slag contains silicon oxide.

8. The method for purifying silicon according to claim 6, wherein the slag contains an alkali metal oxide.

9. The method for purifying silicon according to claim 6, wherein the slag contains at least one member selected from the group consisting of an alkali metal carbonate, an alkali metal hydrogencarbonate and an alkali metal silicate.

10. The method for purifying silicon according to claim 1, wherein the treating gas is blown into the molten silicon through a gas blowing pipe dipped therein while the gas blowing pipe is rotated.

11. The method of claim 1 wherein said treating gas is blown into said molten silicon through a gas flow path which is made at least in part of graphite.

12. The method for purifying silicon according to claim 11, wherein the carbon held in the container comprises at least one member selected from the group consisting of powdery carbon, cylindrical carbon and plate-shaped carbon.

13. The method for purifying silicon according to claim 11, wherein the temperature of an atmosphere in the container is 380° C. or more.

14. The method for purifying silicon according to claim 11, wherein the oxidized gas contains water vapor.

15. The method for purifying silicon according to claim 14, wherein the oxidized gas contains hydrogen.

16. The method for purifying silicon according to claim 11, wherein slag is mixed in the molten silicon.

17. The method for purifying silicon according to claim 16, wherein the slag contains silicon oxide.

18. The method for purifying silicon according to claim 16, wherein the slag contains an alkali metal oxide.

19. The method for purifying silicon according to claim 16, wherein the slag contains at least one member selected from the group consisting of an alkali metal carbonate, an alkali metal hydrogencarbonate and an alkali metal silicate.

20. The method for purifying silicon according to claim 11, wherein the gas flow path comprises a gas blowing pipe which is dipped in said molten silicon while the gas blowing pipe is rotated.

* * * * *